US012668468B2

(12) United States Patent
Jeong

(10) Patent No.: US 12,668,468 B2
(45) Date of Patent: Jun. 30, 2026

(54) GOODS TRANSPORTATION SYSTEM USING AUTONOMOUS MOBILE ROBOT

(71) Applicant: Hwa Yeong Jeong, Changwon-si (KR)

(72) Inventor: Hwa Yeong Jeong, Changwon-si (KR)

(73) Assignee: TAEWOOLT CO., LTD., Busan (KR)

( * ) Notice: Subject to any disclaimer, the term of this patent is extended or adjusted under 35 U.S.C. 154(b) by 337 days.

(21) Appl. No.: 18/588,623

(22) Filed: Feb. 27, 2024

(65) Prior Publication Data

US 2024/0359958 A1 Oct. 31, 2024

(30) Foreign Application Priority Data

Apr. 26, 2023 (KR) ........................ 10-2023-0054924

(51) Int. Cl.
*B66F 9/06* (2006.01)
*B66F 9/065* (2006.01)
*B66F 9/18* (2006.01)

(52) U.S. Cl.
CPC .............. *B66F 9/063* (2013.01); *B66F 9/065* (2013.01); *B66F 9/18* (2013.01)

(58) Field of Classification Search
CPC . B66F 9/063; B66F 9/065; B66F 9/18; B65G 47/52; B65G 35/00
See application file for complete search history.

(56) References Cited

U.S. PATENT DOCUMENTS

| | | | | |
|---|---|---|---|---|
| 7,402,018 | B2 * | 7/2008 | Mountz | B65G 1/137 280/47.35 |
| 9,436,184 | B2 * | 9/2016 | D'Andrea | B65G 1/0492 |
| 9,580,245 | B2 * | 2/2017 | Mansfield | G06V 20/10 |
| 11,361,277 | B2 * | 6/2022 | Edwards | B65G 1/0492 |
| 2022/0041415 | A1 * | 2/2022 | Lilley | B65G 67/02 |
| 2022/0297936 | A1 * | 9/2022 | Velagapudi | B65G 1/0492 |

FOREIGN PATENT DOCUMENTS

| | | | | |
|---|---|---|---|---|
| CN | 115129061 B * | 8/2024 | | B65G 13/00 |
| DE | 102011089858 A1 * | 6/2013 | | B66F 9/063 |
| JP | 04-014220 A | 2/1992 | | |
| KR | 20-2014-0000187 A | 1/2014 | | |

* cited by examiner

*Primary Examiner* — Saul Rodriguez
(74) *Attorney, Agent, or Firm* — PARK LAW FIRM

(57) ABSTRACT

The present invention relates to a goods transportation system for automatically transporting goods by using an autonomous mobile robot (AMR) within a specific place, and more specifically, to a goods transportation system using an autonomous mobile robot (AMR), which can reduce power consumption of the AMR to extend the operational time by loading goods on a cart part having a conveyor installed inside, raising the cart part, on which the goods are loaded, by the AMR entering below the cart part, moving the AMR along a movement path toward a conveyor part to transport the goods in the cart part toward the conveyor part, in a state in which docking between the cart part and the conveyor part is completed, transmitting electric power of the conveyor part to the cart part, and operating the conveyor installed in the cart part to discharge the goods.

5 Claims, 9 Drawing Sheets

GOODS TRANSPORTATION SYSTEM USING AUTONOMOUS MOBILE ROBOT

BACKGROUND OF THE INVENTION

Field of the Invention

The present invention relates to a goods transportation system for automatically transporting goods by using an autonomous mobile robot (AMR) within a specific place, and more specifically, to a goods transportation system using an autonomous mobile robot (AMR), which can reduce power consumption of the AMR to extend the operational time by loading goods on a cart part having a conveyor installed inside, raising the cart part, on which the goods are loaded, by the AMR entering below the cart part, moving the AMR along a movement path toward a conveyor part to transport the goods in the cart part toward the conveyor part, in a state in which docking between the cart part and the conveyor part is completed, transmitting electric power of the conveyor part to the cart part, and operating the conveyor installed in the cart part to discharge the goods.

Background Art

As a device for transporting goods, there is an automatic guided vehicle (AGV). The AGV means a vehicle automatically moving without a driver, and is used in various industrial fields since effectively performing repeated movement of goods.

To address the weaknesses of the AGV, an autonomous mobile robot (AMR) has been developed. The AMR is faster in movement speed than the AGV, can receive guidance of a movement path in real time using various sensors installed thereon, and can adjust the movement path in real time, thereby widening the application range of the AMR.

As a conventional art related to automatic transportation of goods, Korean Patent No. 10-2151764 discloses a mobile robot for logistics transportation and a transportation system including the same.

The conventional art proposes a mobile robot for logistics transportation including: a storage space for storing goods; a robot conveyor which is installed inside the storage space, and includes a rotation part on which goods are placed, and a rotation driving part rotating the rotation part; a gear installed in front of the robot conveyor in order to be linked with an external conveyor; and a rotational force transfer part which is installed between a rotary shaft of the rotation part and the gear to transfer a rotational force. The mobile robot for logistics transportation uses all power, such as driving power of the conveyor for carrying and transporting goods and transferring the goods from the inside to the outside, leading to significant battery consumption and shorter usage time.

As another conventional art, Korean Patent No. 10-2339212 discloses a mobile robot for an automatic warehouse transport robot.

The transfer robot for an automatic warehouse that moves along the travel paths formed between the shelves on which boxes are loaded and transfers the boxes comprises: a body having a box loading unit in which the boxes are accommodated; a loading arm for loading the boxes on the shelves or moving the boxes on the shelves to the box loading unit; and a traveling unit provided in a lower portion of the body to move along the traveling paths. The loading arm includes a fixed arm member installed on the body, a moving arm member for supporting and moving the boxes, and several intermediary arm members provided between the fixed and moving arm members to move the moving arm member. The intermediary arm members include a main intermediary arm member installed to contact the fixed arm member, and an auxiliary intermediary arm member provided between the main intermediary arm member and the moving arm member. A pair of main pinion gears, protruding laterally at the front and rear ends, are installed on the main intermediary arm member. The pair of main pinion gears are connected by a main moving belt. A rack is installed on one side of the fixed arm member in the longitudinal direction to correspond to the main pinion gears, and a rack is installed on one side of the auxiliary intermediary arm member in the longitudinal direction to correspond to the main pinion gears, thereby moving both the main and auxiliary intermediary arm members to both sides. A pair of auxiliary pinion gears is installed at the front and rear ends of the auxiliary intermediary arm member to protrude to right and left sides and to be located at a height different from the main pinion gears. The pair of auxiliary pinion gears are connected by an auxiliary moving belt. A rack is installed on one side of both the main intermediary arm member in the longitudinal direction to correspond to the auxiliary pinion gear, and a rack is installed on one side of the moving arm member in the longitudinal direction to correspond to the auxiliary pinion gear, thereby moving the moving arm member to both sides. Guide members are installed in the longitudinal direction on both sides of the main intermediary arm member and one side of the auxiliary intermediary arm member. Guide rollers are installed on one side of the fixed arm member, the other side of the auxiliary intermediary arm member, and one side of the moving arm member in the longitudinal direction such that the top and the bottom thereof are in contact with support jaws formed at the top and the bottom of the guide member. A moving belt unit for moving the main intermediary arm member to both sides is installed on the inner bottom side of the fixed arm member. The traveling unit includes a main traveling unit installed at the bottom of the body for traveling forward and backward, and an auxiliary traveling unit installed at the bottom of the body for traveling to both sides to be able to ascend and descend. When traveling forward and backward, the auxiliary traveling unit travels in a raised state, and when traveling to horizontally, the auxiliary traveling unit moves downward, such that the main traveling unit travels while being raised upwards.

PATENT LITERATURE

Patent Documents

Patent Document 1: Korean Patent No. 10-2151764 (published on Sep. 3, 2020)

Patent Document 1: Korean Patent No. 10-2339212 (published on Dec. 14, 2021)

SUMMARY OF THE INVENTION

Accordingly, the present invention has been made to solve the above-mentioned problems occurring in the prior arts, and it is an objective of the present invention to provide a goods transportation system using an autonomous mobile robot (AMR), which can reduce power consumption of the AMR to extend the operational time by loading goods on a cart part having a conveyor installed inside, raising the cart part, on which the goods are loaded, by the AMR entering below the cart part, moving the AMR along a movement path toward a conveyor part to transport the goods in the cart part toward the conveyor part, in a state in which docking between the cart part and the conveyor part is completed, transmitting electric power of the conveyor part to the cart part, and operating the conveyor installed in the cart part to discharge the goods.

It is another objective of the present invention to provide a goods transportation system using an autonomous mobile robot (AMR), which can automatically detect the position of the cart part and perform the docking action between the cart part and the conveyor part, since the cart part includes: a base frame on which a conveyor for the transportation of goods is installed; a leg frame which is fixed to the base frame and has casters installed at the bottom thereof; a cover which is fixed to the base frame to protect the goods stored inside; and an arm docking part which is fixed to the base frame for docking between the cart part and the conveyor part, and an RFID tag is installed on one side of the cart part, thereby facilitating smooth transportation of goods.

It is a further objective of the present invention to provide a goods transportation system using an autonomous mobile robot (AMR), which after the docking between the cart part and the conveyor part, uses power transferred through a power connector to operate a conveyor installed on the cart part, thereby reducing power consumption of the AMR to increase the hours of use.

To accomplish the above object, according to the present invention, there is provided a goods transportation system using an autonomous mobile robot (AMR), which transports goods within a specific place using an AMR, including: an AMR which moves along a predetermined path or a movement path using acquired information; a cart part which is mounted on the AMR for loading goods thereon while moving; and a conveyor part which receives the goods loaded on the cart part 20 and moves the goods to a specific location.

The goods transport system using an AMR according to the present invention can load goods on a cart part having a conveyor installed inside, raise the cart part, on which the goods are loaded, by the AMR entering below the cart part, and transport the goods in the cart part toward the conveyor part by moving the AMR along a movement path toward a conveyor part. Since the cart part includes: a base frame on which a conveyor for the transportation of goods is installed; a leg frame which is fixed to the base frame and has casters installed at the bottom thereof; a cover which is fixed to the base frame to protect the goods stored inside; and an arm docking part which is fixed to the base frame for docking between the cart part and the conveyor part, and an RFID tag is installed on one side of the cart part, the goods transport system using an AMR can automatically detect the position of the cart part and perform the docking action between the cart part and the conveyor part, thereby facilitating smooth transportation of goods. The goods transport system using an AMR, after the docking between the cart part and the conveyor part, uses power transferred through a power connector to operate a conveyor installed on the cart part, thereby reducing power consumption of the AMR to increase the hours of use.

DETAILED DESCRIPTION OF THE PREFERRED EMBODIMENT

The present invention relates to a goods transportation system for automatically transporting goods by using an autonomous mobile robot (AMR) within a specific place, and more specifically, to a goods transportation system using an autonomous mobile robot (AMR), which can reduce power consumption of the AMR to extend the operational time by loading goods on a cart part having a conveyor installed inside, raising the cart part, on which the goods are loaded, by the AMR entering below the cart part, moving the AMR along a movement path toward a conveyor part to transport the goods in the cart part toward the conveyor part, in a state in which docking between the cart part and the conveyor part is completed, transmitting electric power of the conveyor part to the cart part, and operating the conveyor installed in the cart part to discharge the goods.

Hereinafter, referring to the attached drawings, a preferred embodiment of the present invention will be described in detail.

Figure 1:
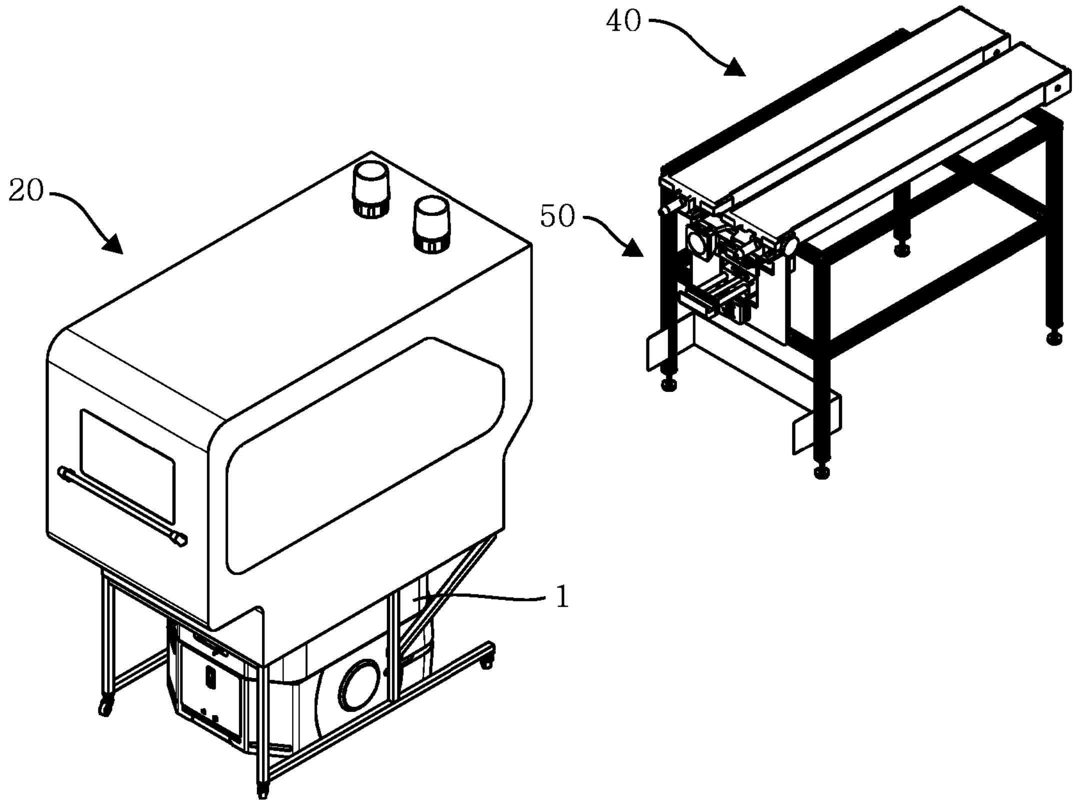
FIG. 1 is a configuration diagram of a goods transportation system using an autonomous mobile robot (AMR) according to the present invention.
Figure 2:
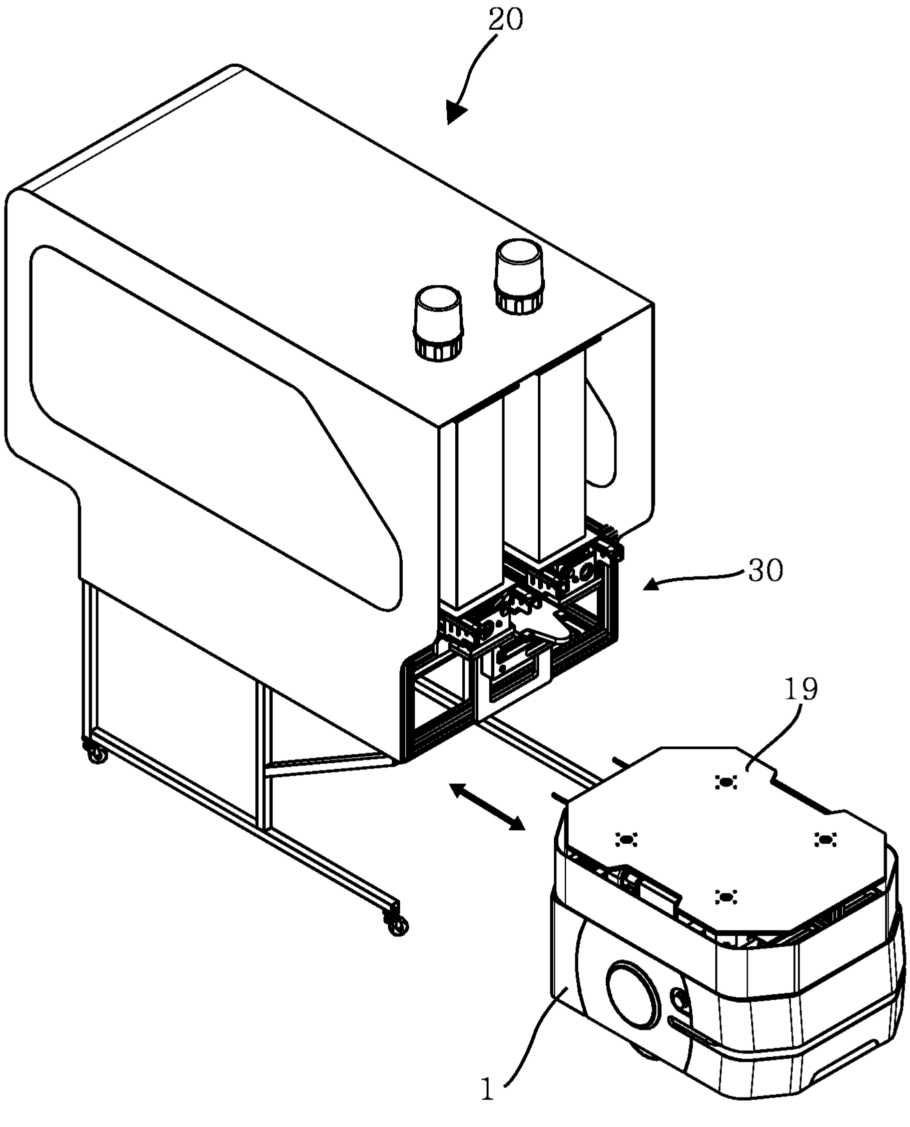
FIG. 2 is a configuration diagram of the AMR and a cart part according to the present invention.
Figure 3:
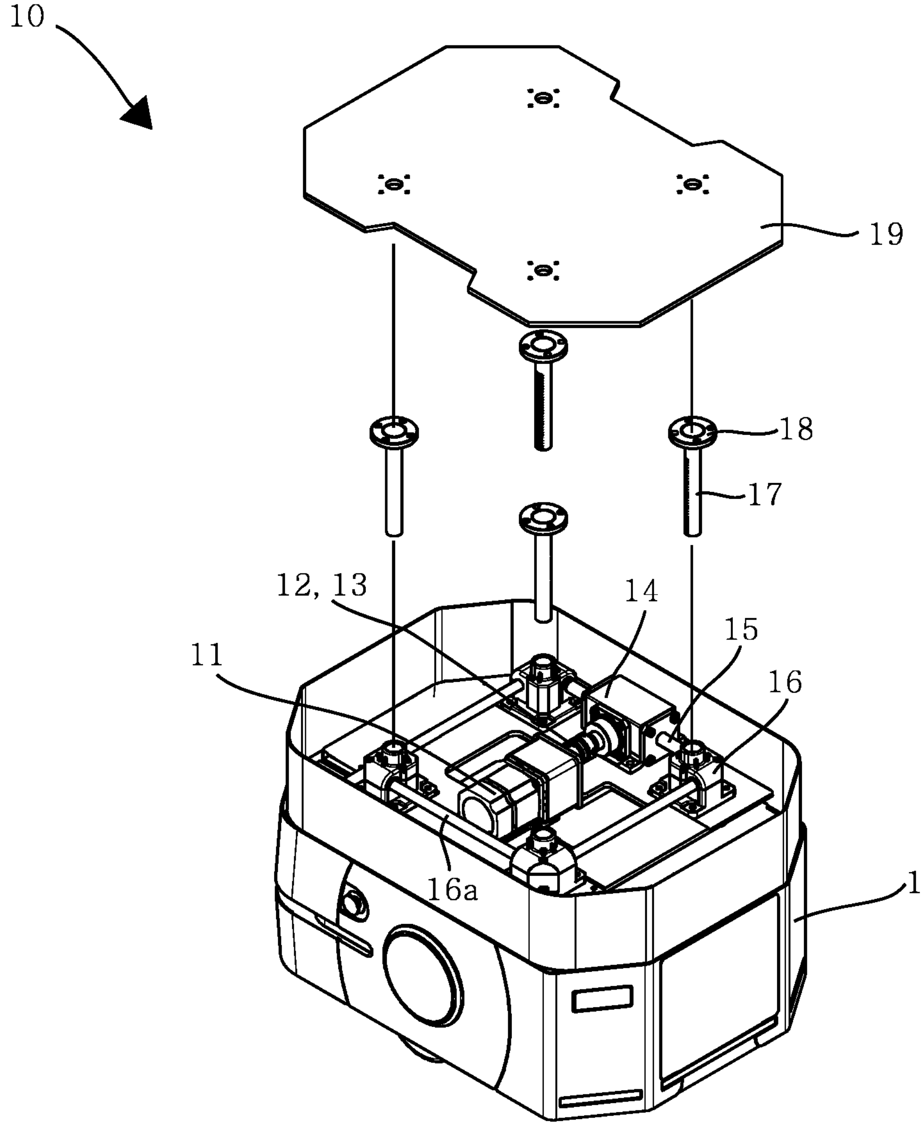
FIG. 3 is a partially exploded view of the AMR according to the present invention.
Figure 4:
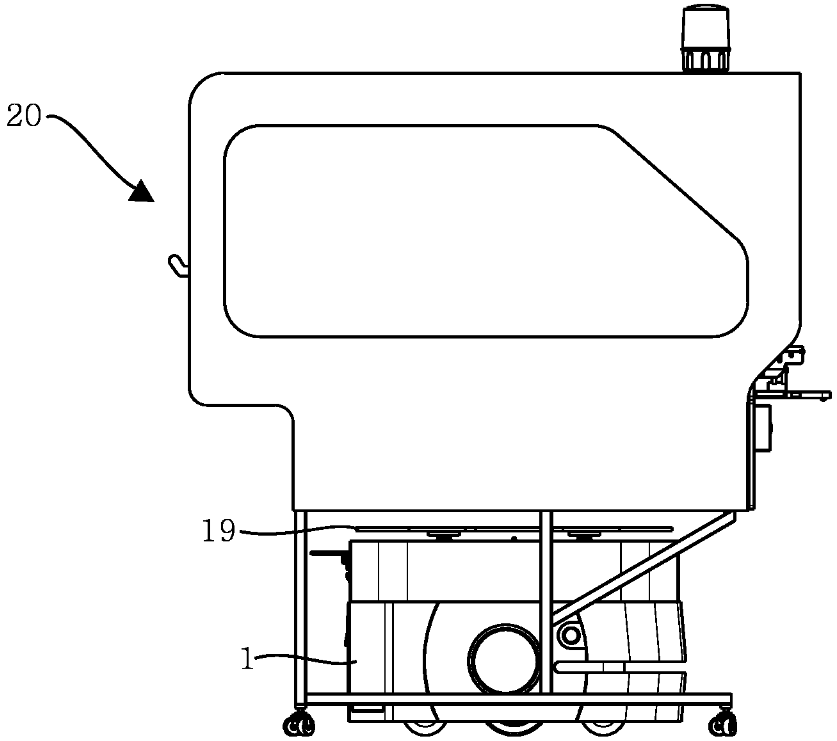
FIGS. 4 and 5 are operational examples of the AMR and the cart part according to the present invention.
Figure 5:
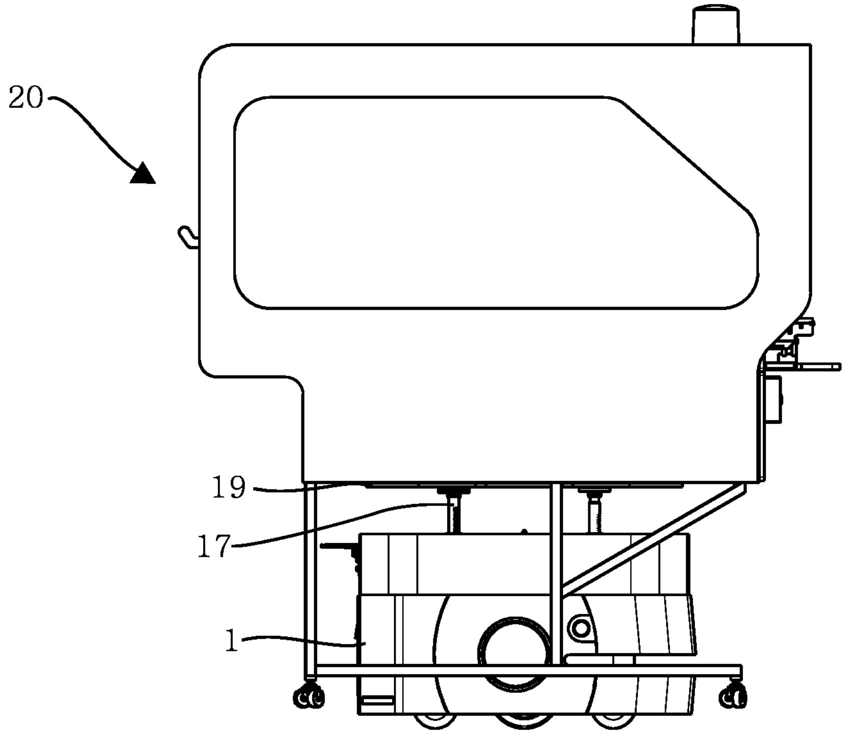

FIG. 1 is a configuration diagram of a goods transportation system using an autonomous mobile robot (AMR) according to the present invention, FIG. 2 is a configuration diagram of the AMR and a cart part according to the present invention, FIG. 3 is a partially exploded view of the AMR according to the present invention, and FIGS. 4 and 5 are operational examples of the AMR and the cart part according to the present invention. The goods transportation system using an autonomous mobile robot (AMR) according to the present invention, which transports goods within a specific place using an AMR includes: an AMR 1 which moves along a predetermined path or a movement path using acquired information; a cart part 20 which is mounted on the AMR 1 for loading goods (W) thereon while moving; and a conveyor part 40 which receives the goods (W) loaded on the cart part 20 and moves the goods (W) to a specific location.

Firstly, the AMR 1 is an autonomous mobile robot that moves along a predetermined path or a path determined based on information acquired from various sensors while loading goods (W) thereon. Alternatively, an automatic guided vehicle (AGV) or an AGV-type mobile robot can be used instead of the AMR.

The cart part 20 is mounted on the AMR 1 and moves while the goods (W) for transportation is loaded inside the cart part 20. The conveyor part 40 receives the goods (W) inside the cart 20 moved by using the AMR 1 and moves the goods (W) to a specific location using a conveyor.

Therefore, after mounting the cart part 20, on which the goods (W) for transportation is loaded inside, onto the top of the AMR 1, the AMR 1 moves along the predetermined path toward the conveyor part 40. After the movement is complete, the AMR 1 moves the goods inside the cart part 20 toward the conveyor part 50.

Additionally, a lifting part 10 capable of lifting the cart part 20 is installed on the top of the AMR 1. The lifting unit 10 includes: a drive motor 11 which generates lifting power; a main gearbox 14 where the rotational force of a motor shaft 12 of the drive motor 11 is transmitted and outputted by diverging to one or both sides thereof; a transmission gearbox 16 to which a rotational force of a gearbox output shaft 15 of the main gearbox 14 is transmitted; a rack gear shaft 17, a portion of which is inserted into the transmission gearbox 16, and which moves in and out of the transmission gearbox 16 by the rotation of the gearbox output shaft 15; a flange 18 which is fixedly coupled to one end of the rack gear shaft 17; and an upper plate 19 which is fixedly coupled to the flange 18.

Firstly, the drive motor 11 is a drive motor different from a driving part used for the movement of the AMR 1. The motor shaft 12 is rotated by electric power supplied from a battery installed in the AMR 1 to the drive motor 11, the rotational force of the motor shaft 12 is transmitted to the main gearbox 14 via a coupling 13. Since a bevel gear is installed inside the main gearbox 14, the direction of power transmission is changed to 90° and is transmitted to the gearbox output shaft 15 on one or both sides. The power transmitted to the gearbox output shaft 15 is then transmitted to the transmission gearbox 16.

Inside the transmission gearbox 16, a portion of the rack gear shaft 17 is inserted, and a pinion gear meshing with the gear of the rack gear shaft 17 is installed. So, the gearbox output shaft 15 rotates the pinion gear, and according to the rotation of the pinion gear, the rack gear shaft 17 ascends or descends in the axial direction of the rack gear shaft 17. The rotational power transmitted to the transmission gearbox 16 is transmitted to another adjacent transmission gearbox via a power transmission shaft **16*a*, such that all of the four rack gear shafts 17 installed in the AMR 1** ascend or descend by the same distance.

The flange 18 is fixedly installed at one end of the rack gear shaft 17, and a flat-shaped upper plate 19 is installed on the flange 18, such that the upper plate 19 also ascends or descends according to the ascending or descending movement of the rack gear shaft 17.

Therefore, as illustrated in FIG. 4, when power is supplied to the drive motor 11 while the AMR 1 is under the cart part 20, the rotational force of the motor shaft 12 of the drive motor 11 is transmitted to the rack gear shaft 17, such that the rack gear shaft 17 ascends. Such ascending movement of the rack gear shaft 17 lifts the upper plate 19 and, as illustrated in FIG. 5, performs a lifting action that raises the entire cart part 20 off the ground. In this state, the cart part 20 is moved, thereby preventing wear of casters 23 installed in the cart part 20.

Figure 6:
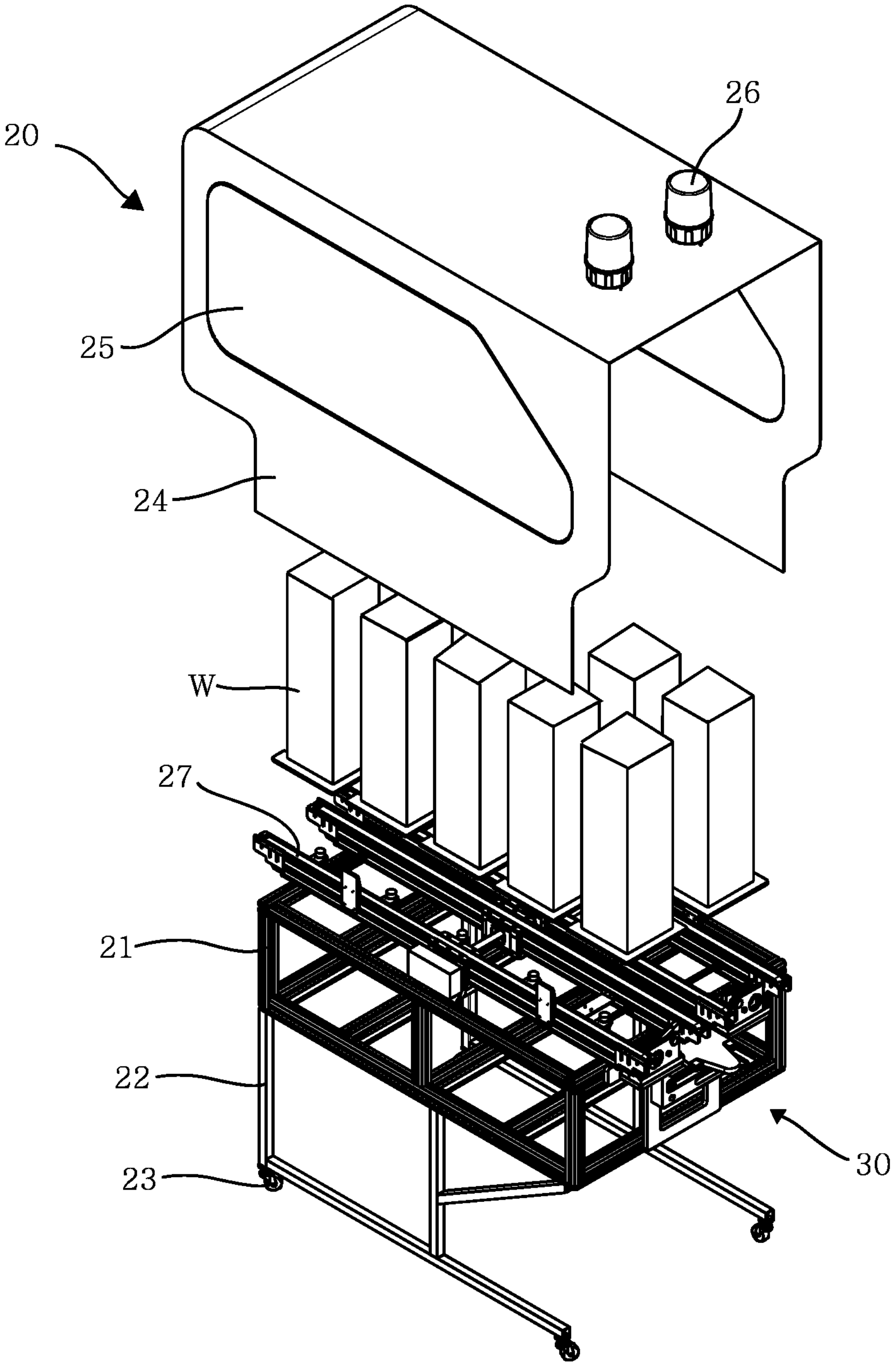
FIG. 6 is a partially exploded view of the cart part according to the present invention.
Figure 7:
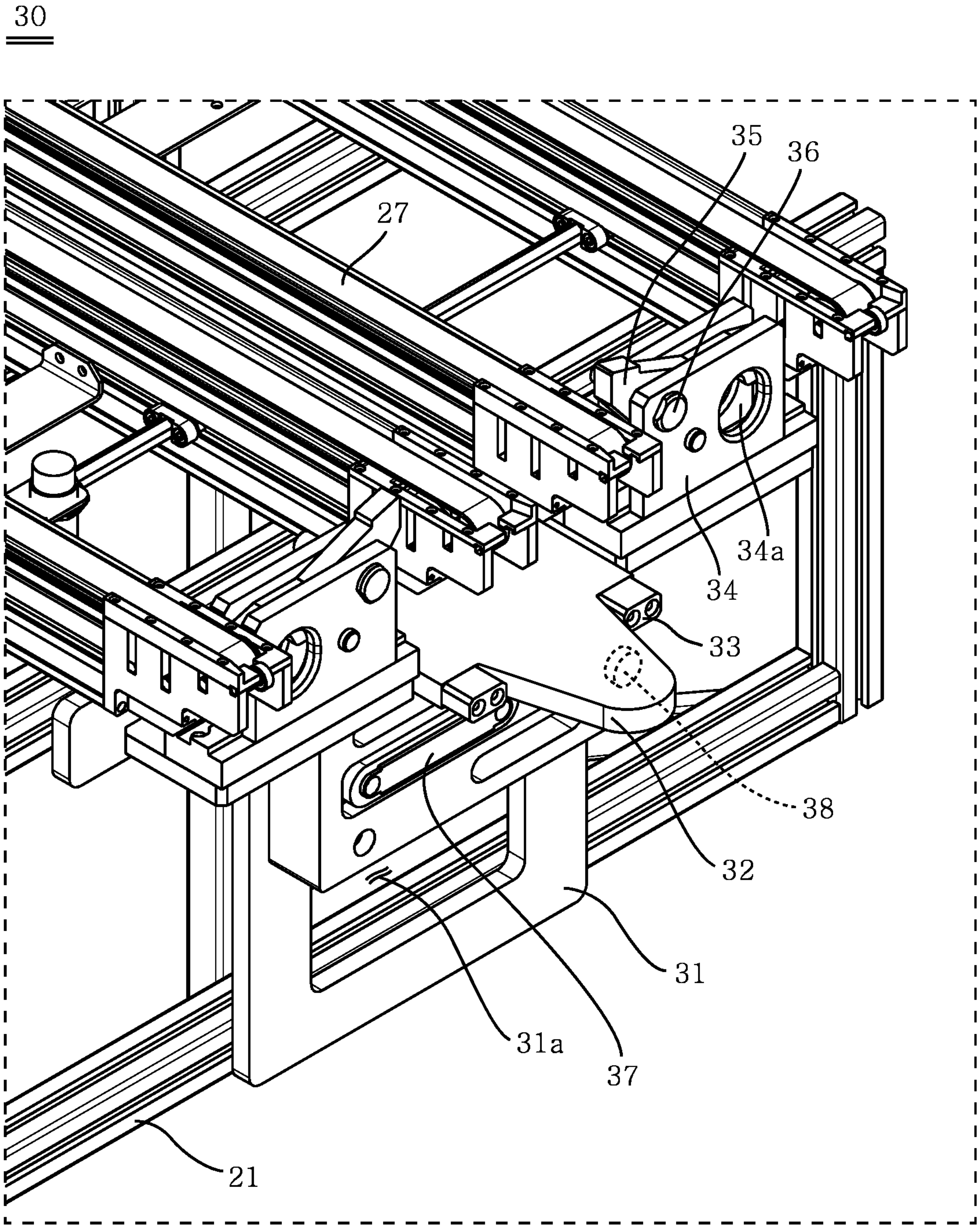
FIG. 7 is a partially enlarged view of the cart part according to the present invention.

FIG. 6 is a partially exploded view of the cart part according to the present invention, and FIG. 7 is a partially enlarged view of the cart part according to the present invention. The cart part 20 includes: a base frame 21 on which a conveyor 27 for the transportation of goods (W) is installed; a leg frame 22 which is fixed to the base frame 21 and has casters 23 installed at the bottom thereof; a cover 24 which is fixed to the base frame 21 to protect the goods stored inside; and an arm docking part 30 which is fixed to the base frame 21 for docking between the cart part 20 and the conveyor part 40. An RFID tag 38 is installed on one side of the cart part 20.

Firstly, the base frame 21 is a basic frame for forming the cart part 20, and the illustrated embodiment relates to a hexahedral frame with an empty interior. The leg frame 22, which has the casters 23 for passive movement of the cart part 20, is fixed to the bottom of the base frame 21. The cover 24 is fixed to the base frame 21 while surrounding the base frame 21 excluding the front face and the bottom face of the base frame 21. An inspection window 25 is installed on one side of the cover 24 for checking the internal state or the stored goods (W) with the naked eyes.

The arm docking part 30 is fixed to the base frame 21 and designed for docking the cart part 20 and the conveyor part 40. Since an RFID tag 38 is installed on one side of the arm docking part for communication with the conveyor part 40.

Additionally, the arm docking part 30 includes: a fixed plate 31 which is fixed to the base frame 21; a protruding plate 32 which is fixed to the fixed plate 31 and is installed to protrude from the fixed plate 31 to guide the coupling position of the cart part 20; lock plates 34 which are installed on both sides of the protruding plate 32 and have pin holes **34*a* formed therein; a lock frame 35 which is installed to rotate around a hinge 36 on the lock plate 34 and to fix the lock pin 53; and a negative (−) power connector 37 for supplying power to the conveyor 27 installed in the cart part 20**.

In other words, the arm docking part 30 is designed to fix the cart part 20 in close contact with the conveyor part 40. The fixed plate 31 is a plate fixed to one side of the base frame 21, and the protruding plate 32 is a plate protruding a predetermined length from the fixed plate 31. In the illustrated embodiment, the protruding plate has a triangular cross-section that narrows as it extends away from the fixed plate 31, so while the protruding plate 32 is coupled to a fitting groove **52*a* of a fitting plate 52 installed on the conveyor part 40**, the center position is aligned automatically.

The lock plate 34 is installed on both sides of the protruding plate 32 such a lock pin 53 of the conveyor part 40 is coupled to the lock plate 34. For this, the lock plate 34 has a pin hole **34*a*, and the lock frame 35 is installed on the lock plate 34 to maintain a state in which the lock pin 53 is fit into the pin hole 34*a*. When the lock pin 53 enters towards the pin hole 34*a*, the lock frame 35 rotates around the hinge 36, and the lock pin 53 is firmly held by elasticity of a spring installed in the lock plate 34**.

The negative (−) power connector 37 is a power connector to transfer power from the conveyor part 40 toward the cart part 20.

Figure 8:
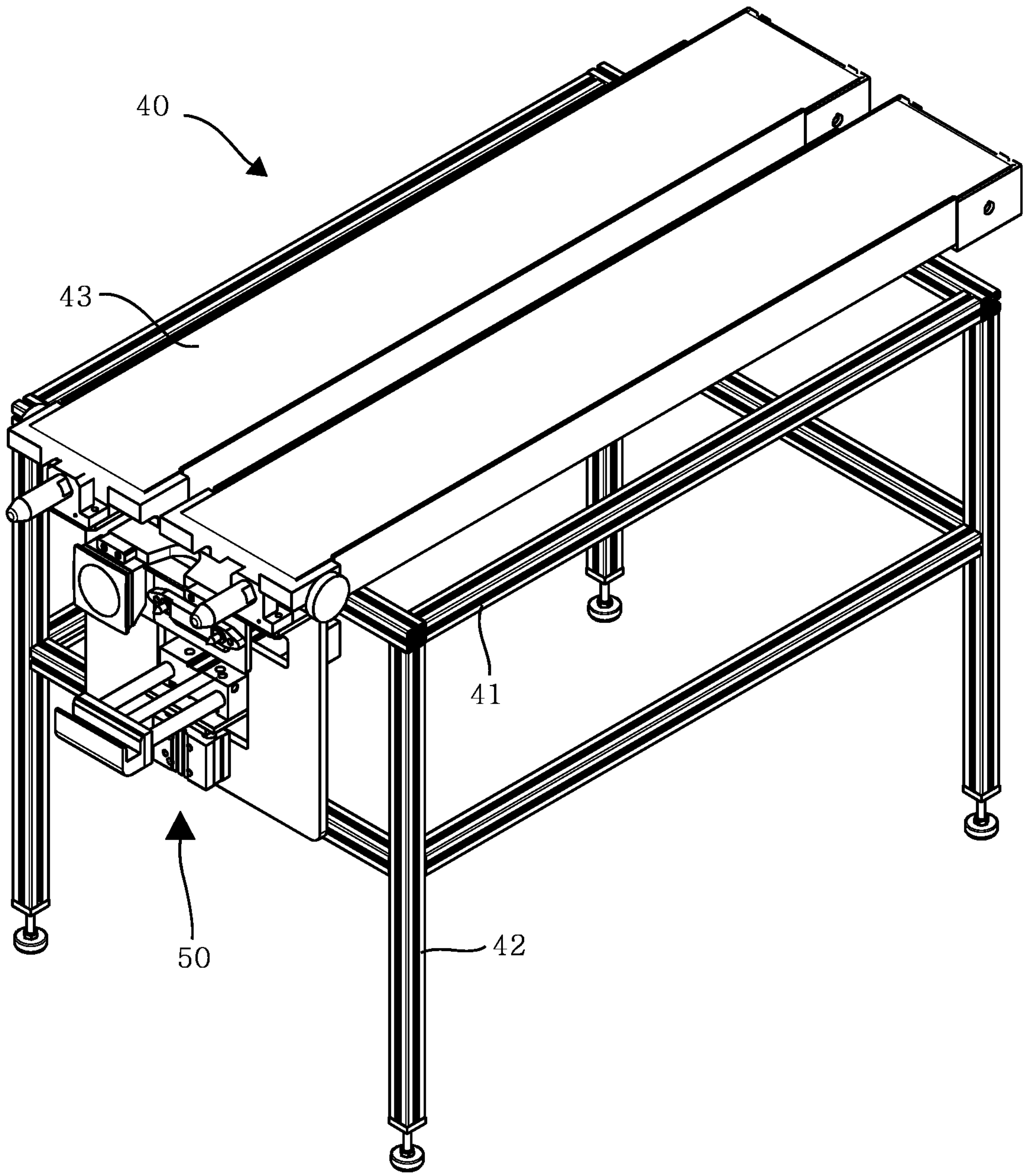
FIG. 8 is a configuration diagram of a conveyor part according to the present invention.
Figure 9:
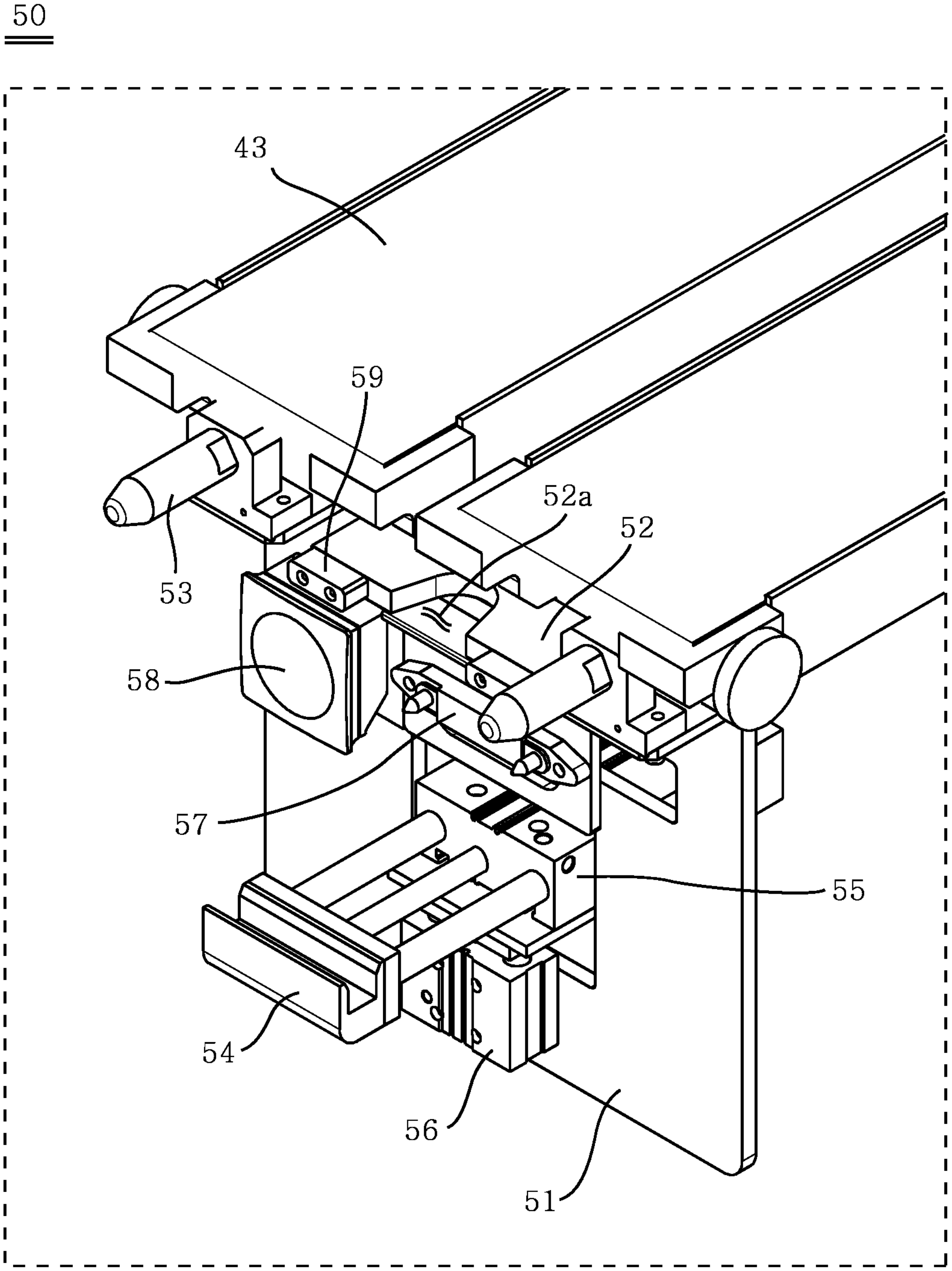
FIG. 9 is a partially enlarged view of the conveyor part according to the present invention.

FIG. 8 is a configuration diagram of a conveyor part according to the present invention, and FIG. 9 is a partially enlarged view of the conveyor part according to the present invention. The conveyor part 40 includes: a base frame 41 which has a conveyor 43 installed for the transportation of goods (W); a leg frame 42 which is fixed to the base frame 41; and a male docking part 50 which is fixed to the base frame 41 for docking with the cart part 20. An RFID reader 58 is installed on one side of the conveyor part 40 to detect the proximity of the cart part 20.

The base frame 41 is a basic frame for forming a body of the conveyor part 40, and the leg frame 42 is installed on one side of the base frame 41 to support the base frame 41. The male docking part 50 is fixed to the base frame 41 for docking between the cart part 20 and the conveyor part 40, and an RFID reader 58 is installed on one side of the male docking part 50 so as to communicate with the RFID tag 38 installed in the cart part 20 to detect the proximity of the cart part 20.

Furthermore, the male docking part 50 includes: a fastening plate 51 fixed to the base frame 41; a lock pin 53 fixed to one side of the fastening plate 51 and inserted into the pin hole 34*a* of the lock plate 34 during docking between the cart part 20 and the conveyor part 40; a positive (+) power connector 57 for supplying power to the conveyor 27 installed in the cart part 20; a gripper 54 to press the cart part 20 toward the conveyor part 40; a horizontal movement cylinder 55 for the horizontal movement of the gripper 54; and a vertical movement cylinder 56 for the vertical movement of the gripper 54.

That is, the male docking part 50 is provided to fix the cart part 20 moved toward the conveyor part 40 in close contact with the conveyor part 40. The fastening plate 51 is a plate fixed to one side of the base frame 41, and the fitting plate 52 having the fitting groove 52*a* is installed on the fastening plate 51. The protruding plate 32 of the cart part 20 is coupled to the fitting groove 52*a* of the fitting plate 52, and the shape of the protruding plate 32 corresponds to the shape of the fitting groove 52*a*.

The lock pin 53 protrudes a predetermined length from the fastening plate 51, and penetrates through the pin hole 34*a* of the lock plate 34 installed in the cart part 20. The positive (+) power connector 57 is a power connector to transfer power from the conveyor part 40 to the cart part 20.

The gripper 54 is configured to maintain the state in which the cart part 20 is in close contact with the conveyor part 40. When the cart part 20 moves close to the conveyor part 40, the conveyor part 40 detects the movement of the cart part 20 through the RFID reader 58 and the RFID tag 38. After the detection, the gripper 54 is moved toward the cart part 20, and then, is moved toward the gripper hole 31*a* formed in the fixed plate 31. Accordingly, the gripper 54 grips the fixed plate 31 by the horizontal movement cylinder 55 and the vertical movement cylinder 56, and then, presses the cart part 20 toward the conveyor part 40 so that a firm coupling state between the cart part 20 and the conveyor part 40 can be maintained.

At this time, since the gripper 54 can raise and lower the cart part 20, even though the height of the cart part 20 is changed due to wear of components, such as the casters 23, according to the use period of the cart part 20, the gripper 54 can consistently maintain the cart part 20 in close contact with the conveyor part 40 at a constant position, thereby facilitating transportation of the goods stored in the cart part.

Here, rollers can be installed under the protruding plate 32 to facilitate the insertion action of the protruding plate 32 into the fitting plate 52 of the conveyor part 40.

When the cart part 20 is completely close and fixed to the conveyor part 40 by the gripper 54, power of the conveyor part 40 is transmitted toward the cart part 20 by the positive (+) and negative (−) power connectors 57 and 37, so the conveyor 27 installed on the cart part 20 is operated and the goods stored on the top of the conveyor 27 are moved toward the conveyor 43 of the conveyor part 40, then transportation of the goods (W) is completed. After the completion of the transportation of the goods, the gripping of the cart part 20 by the gripper 54 is released. After the release, the AMR 1 moves the cart part 20 to the position for loading goods again.

Figure 10:
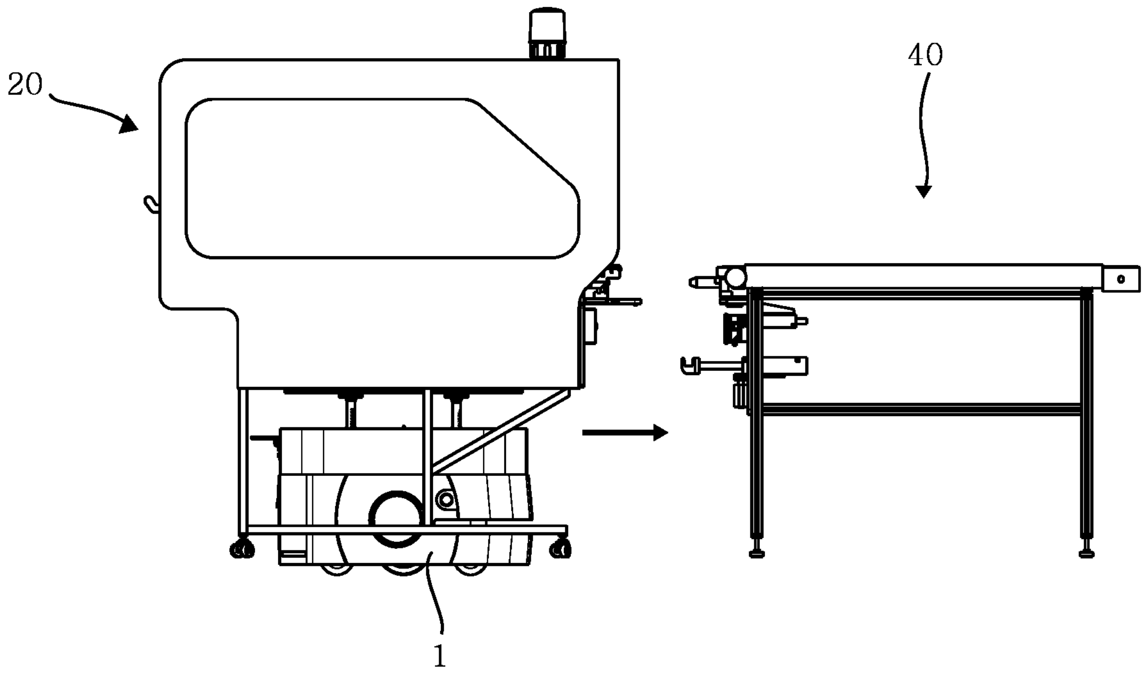
FIGS. 10 and 11 are operational examples of the present invention.
Figure 11:
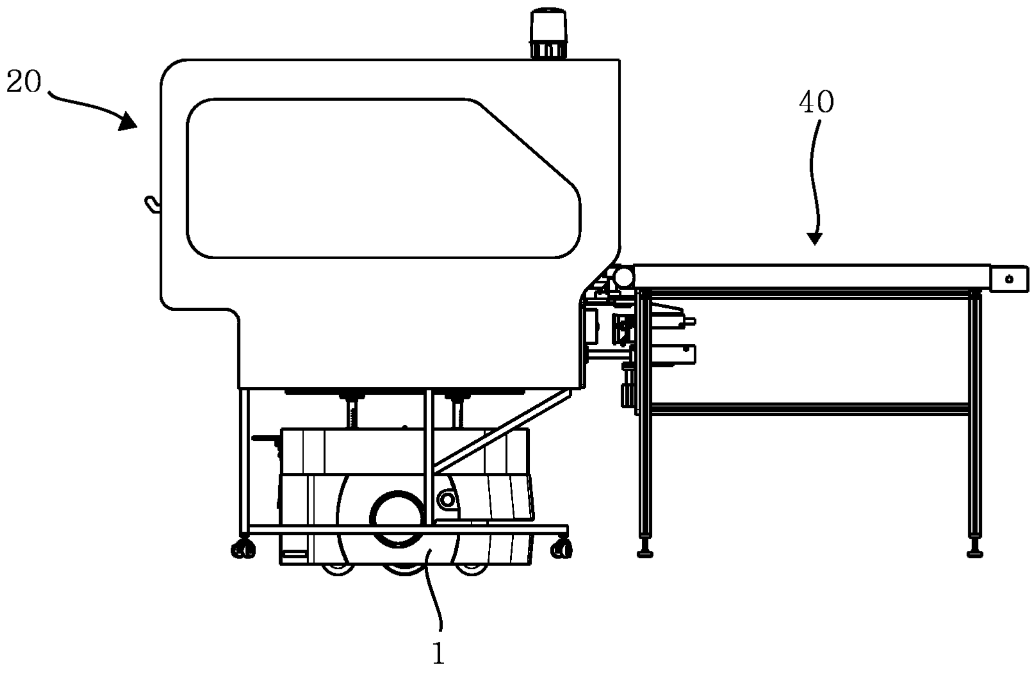

FIGS. 10 and 11 are operational examples of the present invention, wherein FIG. 10 illustrates the movement of the cart part 20 toward the conveyor part 40, and FIG. 11 illustrates a state in which the cart part 20 is completely moved toward the conveyor part 40 and is fully pressed by the operation of the gripper 54.

The unexplained reference numeral 26 designates a warning light, and 33 and 59 designate stopper pads. The warning light 26 is provided to indicate the movement of the cart part 20 when the car part 20 moves to prevent accidents, and the stopper pads 33 and 59 are provided to absorb impact during the tight coupling of the cart part 20 with the conveyor part 40.

Finally, the goods transport system using an AMR according to the present invention can load goods on a cart part having a conveyor installed inside, raise the cart part, on which the goods are loaded, by the AMR entering below the cart part, and transport the goods in the cart part toward the conveyor part by moving the AMR along a movement path toward a conveyor part. Since the cart part includes: a base frame on which a conveyor for the transportation of goods is installed; a leg frame which is fixed to the base frame and has casters installed at the bottom thereof; a cover which is fixed to the base frame to protect the goods stored inside; and an arm docking part which is fixed to the base frame for docking between the cart part and the conveyor part, and an RFID tag is installed on one side of the cart part, the goods transport system using an AMR can automatically detect the position of the cart part and perform the docking action between the cart part and the conveyor part, thereby facilitating smooth transportation of goods. The goods transport system using an AMR, after the docking between the cart part and the conveyor part, uses power transferred through a power connector to operate a conveyor installed on the cart part, thereby reducing power consumption of the AMR to increase the hours of use.

What is claimed is:

1. A goods transportation system using an autonomous mobile robot (AMR), which transports goods within a specific place using the AMR, comprising:

the AMR which moves along a predetermined path or a movement path using acquired information;

a cart part which is mounted on the AMR for loading goods thereon while moving; and a conveyor part which receives the goods loaded on the cart part and moves the goods to a specific location, wherein the conveyor part includes: a base frame which has a conveyor installed for the transportation of goods; a leg frame which is fixed to the base frame; and a male docking part which is fixed to the base frame for docking with the cart part, and an RFID reader is installed on one side of the conveyor part to detect the proximity of the cart part.

2. The goods transportation system according to claim 1, wherein a lifting part capable of lifting the cart part is installed on the top of the AMR, and comprises: a drive motor which generates lifting power; a main gearbox where the rotational force of a motor shaft of the drive motor is transmitted and outputted by diverging to one or both sides thereof; a transmission gearbox to which a rotational force of a gearbox output shaft of the main gearbox is transmitted; a rack gear shaft, a portion of which is inserted into the transmission gearbox and, which moves in and out of the transmission gearbox by the rotation of the gearbox output shaft; a flange which is fixedly coupled to one end of the rack gear shaft; and an upper plate which is fixedly coupled to the flange.

3. The goods transportation system according to claim 1, wherein the cart part comprises: a base frame on which a conveyor for the transportation of goods is installed; a leg frame which is fixed to the base frame and has casters installed at the bottom thereof; a cover which is fixed to the base frame to protect the goods stored inside; and an arm docking part which is fixed to the base frame for docking between the cart part 20 and the conveyor part, and an RFID tag is installed on one side of the cart part.

4. The goods transportation system according to claim 3, wherein the arm docking part comprises: a fixed plate which is fixed to the base frame; a protruding plate which is fixed to the fixed plate and is installed to protrude from the fixed plate to guide the coupling position of the cart part; lock plates which are installed on both sides of the protruding plate and have pin holes formed therein; a lock frame which is installed to rotate around a hinge on the lock plate and to fix the lock pin; and a negative (−) power connector for supplying power to the conveyor installed in the cart part.

5. The goods transportation system according to claim 1, wherein the male docking part comprises: a fastening plate fixed to the base frame; a lock pin fixed to one side of the fastening plate and inserted into the pin hole of the lock plate during docking between the cart part and the conveyor part; a positive (+) power connector for supplying power to the conveyor installed in the cart part; a gripper to press the cart part toward the conveyor part; a horizontal movement cylinder for the horizontal movement of the gripper; and a vertical movement cylinder for the vertical movement of the gripper.

* * * * *